United States Patent [19]

Honma

[11] Patent Number: 5,074,240
[45] Date of Patent: Dec. 24, 1991

[54] DEVELOPER MATERIAL COATING APPARATUS HAVING SELECTIVE COATING UNIT

[75] Inventor: Yoshiyasu Honma, Nagoya, Japan

[73] Assignee: Brother Kogyo Kabushiki Kaisha, Aichi, Japan

[21] Appl. No.: 557,029

[22] Filed: Jul. 25, 1990

[30] Foreign Application Priority Data

Aug. 11, 1989 [JP] Japan ................................. 1-94828[U]

[51] Int. Cl.[5] .......................................... G03G 15/06
[52] U.S. Cl. .................................. 118/625; 118/648;
118/651; 118/653; 118/679; 355/262
[58] Field of Search ................ 118/50.1, 621, 624–625,
118/638, 644, 647–649, 651–653, 661, 665–667,
669, 677–679; 355/73, 245, 259, 265, 312, 262

[56] References Cited
U.S. PATENT DOCUMENTS

| | | | |
|---|---|---|---|
| 2,784,694 | 3/1957 | Crumrine et al. | 118/652 |
| 3,672,326 | 6/1972 | Schulze | 118/680 |
| 4,027,607 | 6/1977 | Pan et al. | 118/654 |

Primary Examiner—Richard V. Fisher
Assistant Examiner—Charles K. Friedman
Attorney, Agent, or Firm—Oliff & Berridge

[57] ABSTRACT

A developer material coating apparatus for electrostatically coating developer material on a support member in a developer material coating region to form a developer sheet, comprising a counter electrode roller for feeding the support member through the developer material coating region while carrying the support member thereof, a carry roller for triboelectrically charging the developer material and electrostatically supplying the charged developer material to the support member disposed in the developer material coating region, at least one array of electrodes arranged along the inner surface of the counter electrode roller and a control unit for selectively supplying said electrodes with a voltage having an opposite polarity to that of the charged developer material to thereby coat the developer material on a desired portion of the support member.

16 Claims, 6 Drawing Sheets

DEVELOPER MATERIAL COATING APPARATUS HAVING SELECTIVE COATING UNIT

BACKGROUND OF THE INVENTION

This invention relates to a developer material coating apparatus for coating granular developer material on a support member such as a plain paper to form a developer sheet for a color image, and more particularly to a developer material coating apparatus in which the developer material is selectively coated on a desired portion of the support member.

To form a color image on a support member such as a plain paper, there has been known an image forming apparatus such as a color copying machine which utilizes microcapsules encapsulating dye precursor, photopolymerization initiator, etc. and having a mechanical strength variable in accordance with intensity of light irradiated thereto. In this type of image forming apparatus, a microcapsule sheet on which the microcapsules are carried and to which light has been irradiated through an original is closely contacted with a developer sheet which is formed by coating granular developer material on the surface of a support member such as a plain paper or the like in a developer material coating apparatus, and these contacted sheets are fed to a pressure-developing unit to be subjected to a pressure development. In the pressure-developing unit, those microcapsules which have not been exposed to the light and thus have low mechanical strength are ruptured under pressure to issue the dye precursor therefrom, and the dye precursor issued from the microcapsules are reacted with the developer material on the developer sheet to form a visible image on the developer sheet. Thereafter, the developer sheet having the visible image thereon is fed to a heat-fixing unit to thermally fix the visible image on the developer sheet.

FIG. 1 shows a conventional developer material coating apparatus used in the image forming apparatus as described above.

The conventional developer material coating apparatus as shown in FIG. 1 includes a developer material coating unit, a support member feeding unit and a casing C having a sheet inlet 29 for inserting the support member therethrough and a sheet outlet 28 for discharging therethrough a developer sheet which is formed of the support member and the developer material layer coated on the support member. The developer material coating unit and the support member feeding unit are accommodated in the casing C.

The developer material coating unit comprises a tank (hopper) 20 for accommodating granular developer material S, a rotatable carry roller 22 for feeding the developer material to a developer material coating region 27 defined between the support member feeding unit and the developer material coating unit while carrying the developer material thereon, and a supply roller 21 provided beside the carry roller 22 for triboelectrically charging the developer material in cooperation with the carry roller 22 and supplying the charged developer material to the surface of the carry roller 22. As shown in FIG. 1, the carry roller 22 is grounded.

Further, the support member feeding unit comprises a counter electrode roller 23 disposed spacedly away from the carry roller 22 at a distance (d) so as to confront the carry roller 22, a pair of guide rollers 25a and 25b which are provided away from the counter electrode roller 23 and near to the sheet outlet 28 and the sheet inlet 29, respectively, a carry belt 24 such as an endless belt suspended among the counter electrode roller 23 and the guide rollers 25a and 25b for carrying the support member P thereon, and a D.C. voltage source 26 for applying a voltage to the counter electrode roller 23. In this case, if the developer material is positively charged in the developer material coating unit, a negative voltage is supplied to the counter electrode roller 23 through one terminal of the voltage source 26 to electrostatically attract the positively-charged developer material S to the counter electrode roller 23. The other terminal, that is, a positive terminal of the voltage source 26 is grounded as shown in FIG. 1. On the other hand, if the developer material is negatively charged, a positive voltage is supplied to the counter electrode roller 23.

An operation of producing a developer sheet from the support member such as a plain paper and the developer material will be described hereunder.

The carry roller 22 and the supply roller 21 are rotated while contacted with each other to thereby triboelectrically charge particles of the developer material S in the tank 20. A polarity of the charged developer material S is dependent on a physical property of the developer material, a kind of material constituting the surface of the carry roller, etc., and in this embodiment the developer material S is assumed to be positively charged. The positively-charged particles of the developer material S are attached to the peripheral surface of the carry roller 22 and are fed to the developer material coating region 27 by rotating the carry roller 22 by a motor (not shown). The counter electrode roller 23 is supplied with a negative voltage from the D.C. voltage source 26, and the carry belt 24 travels clockwisely by rotation of the counter electrode roller 23 and the guide rollers 25a and 25b. The support member P such as a plain paper is carried on the carry belt 24 and fed to the developer material coating region 27 through the feeding operation of the carry belt 24.

As described above, since the counter electrode roller 23 is kept at a negative potential and the carry roller 22 is grounded, an electric field occurs in the developer material coating region 27 defined between the counter electrode roller 23 and the carry roller 22. Accordingly, the positively-charged particles of the developer material S are electrostatically attracted (that is, flights) from the carry roller 22 toward the counter electrode roller 23, and are attached to the surface of the support member P to form a developer material layer m on the support member P.

The carry roller 22 used in the developer material coating apparatus 50 comprises a grounded metal shaft and a sleeve-type insulating member formed of epoxy resin or the like which surrounds the metal shaft. The developer material S is triboelectrically charged due to the friction between the developer material S and the surface of the insulating member of the carry roller 22. When the particles of the developer material S are positively charged, the surface of the insulating member of the carry roller 22 is charged at the opposite polarity to that of the developer material S (in this case, negatively), and the positively-charged particles of the developer material S are electrostatically attached to the surface of the insulating member of the carry roller 22.

In the conventional developer material coating apparatus thus constructed, the whole surface of the support member is coated with the developer material, that is, any portion on the surface of the support member is coated with the developer material. In a case where a user wants to print, by a laser printer or a typewriter, letters, characters and other images on a blank portion on the developer sheet on which a color image has not been formed in the image forming apparatus, however, it is liable to occur that the letters, characters and other images can not be printed even on the blank portion or are blurred even if printed on the blank portion, because the developer material is coated on the whole surface of the developing sheet and thus prevents the printing of the letters, characters and other images on any portion of the developing sheet.

SUMMARY OF THE INVENTION

An object of this invention is to provide developer material coating apparatus capable of selectively coating developer material on a desired portion of the surface of a support member.

In order to attain the above object, a developer material coating apparatus according to this invention in which the developer material is electrostatically coated on a support member in a developer material coating region to form a developer sheet, comprises support member feeding means for feeding the support member through the developer material coating region while carrying the support member thereof, developer material coating means for triboelectrically charging the developer material and electrostatically supplying the charged developer material to the support member disposed in the developer material coating region, and control means for selectively coating the charged developer material on a desired portion of the support member, wherein the control means comprises at least one array of electrodes arranged along the surface of said support member feeding means and a control unit for selectively supplying the electrodes with a voltage having an opposite polarity to that of the charged developer material.

According to the developer material coating apparatus thus constructed, upon rotation of the carry roller by a motor, the particles of the developer material are frictionally contacted with the surface of the carry roller and are triboelectrically charged. Thereafter, the charged developer material is fed to the developer material coating region while carried on the carry roller. On the other hand, the control unit which is supplied with a voltage, controls a voltage supply operation for supplying the voltage to the electrodes arranged juxtaposedly along the inner or outer surface of the counter electrode roller to selectively supply the voltage to the electrodes, thereby to locally generate an electrical field at a desired portion, or in other words, to locally generate no electric field at a desired portion. As a result, when the support member is being passed through the developer material coating region and the developer material is fed in the developer material coating region, a desired portion on the support member can be selectively coated with the developer material.

DETAILED DESCRIPTION OF THE INVENTION

Preferred embodiments of this invention will be described hereunder with reference to the accompanying drawings.

Figure 2:
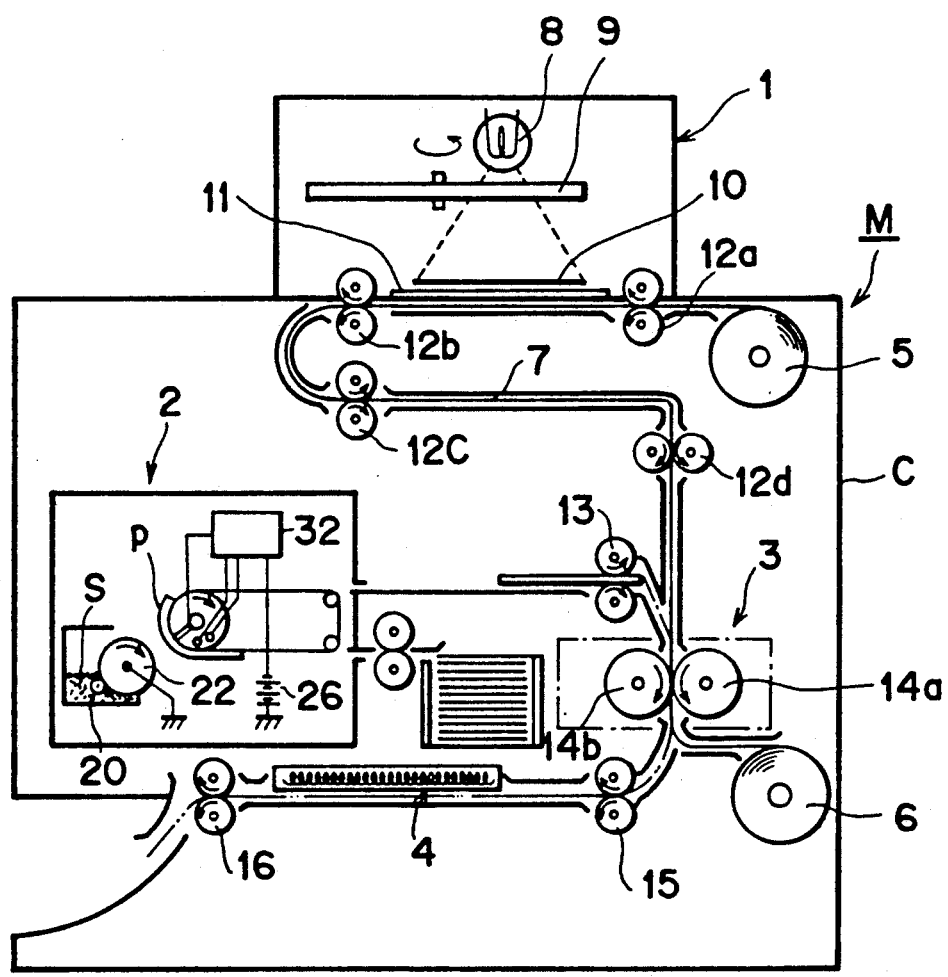
FIG. 2 shows the overall arrangement of an image forming apparatus in which the developer material coating apparatus of this invention is used.

FIG. 2 shows a color image forming apparatus M provided with the developer material coating apparatus of this invention.

The color image forming apparatus M comprises an exposure unit 1 provided at an upper portion of the apparatus for exposing a microcapsule (photosensitive and pressure-sensitive) sheet 7 to light through an original 10 to form a latent image on the microcapsule sheet 7, and a casing C for accommodating the microcapsule sheet 7 which travels between a sheet supply roller 5 and a sheet take-up roller 6, a developer material coating apparatus 2 provided substantially at the center of the casing M for producing a developer sheet from a support member P and developer material, a pressure-developer unit 3 comprising a pair of pressure-developing rollers 14a and 14b provided beside the coating apparatus 2 for performing a pressure-developing process and so on.

In the pressure-developing unit 3, the microcapsule sheet 7 which has been exposed to the light reflected from the original is contacted under pressure with the developer sheet formed in the coating apparatus 2, to thereby develop the latent image on the microcapsule sheet 7 into a visible image on the developer sheet. After this pressure-developing process, the developer sheet is separated from the microcapsule sheet and fed to a heat-fixing unit 4 to thermally fix the visible image on the developer sheet.

The exposure unit 1 includes a halogen lamp 8 and a rotatable color separation filter unit 9 provided below the halogen lamp 8 for passing a light emitted from the halogen lamp 9 therethrough and separating the light into three primary color components. Below the color separation filter unit 9, the original 10 is disposed on an original stand 11. Further, two pairs of guide rollers 12a and 12b are provided beside both sides of the original stand 11 (beside the right and left sides of the original in the FIG. 2) and other guide rollers 12c and 12d are further provided downstream of the guide rollers 12b along a sheet feed path.

The microcapsule sheet 7 is drawn out of the sheet supply roll 5 and is fed through the guide rollers 12a to the original stand 11 for an exposure process to form the latent image corresponding to an original image on the microcapsule sheet 7. The microcapsule sheet having the latent image thereon is further fed through the guide rollers 12b and the other guide rollers 12c and 12d to the pressure-developing unit 3.

A stack of plural support members such as plain paper are accommodated in a cassette. A topmost support member is picked up from the stack of the support members, for example by a sector roller (not shown) and fed through a pair of guide rollers and the sheet inlet 29 to the carry belt 24. The support member P carried on the carry belt 24 is fed to the developer material coating region 27 so that the developer material is coated on the support member to form a developer sheet. The developer sheet, which has been formed in the developer material coating apparatus 2 in a manner as described below, is fed through a pair of guide rollers 13 to a gap between a pair of pressure rollers 14a and 14b of the pressure-developing unit 3 while superposed on the microcapsule sheet 7. The pressure development is conducted on these superposed sheets under a pressure of the pressure rollers 14a and 14b.

The microcapsule sheet 7 passed through the pressure-developing unit 3 is taken up by the sheet take-up roller 6. On the other hand, the developer sheet passed through the pressure-developing unit 3 is fed through a pair of guide rollers 15 to the heat-fixing unit 4, and then discharged through a pair of guide rollers 16 to an outside of the apparatus.

Figure 1:
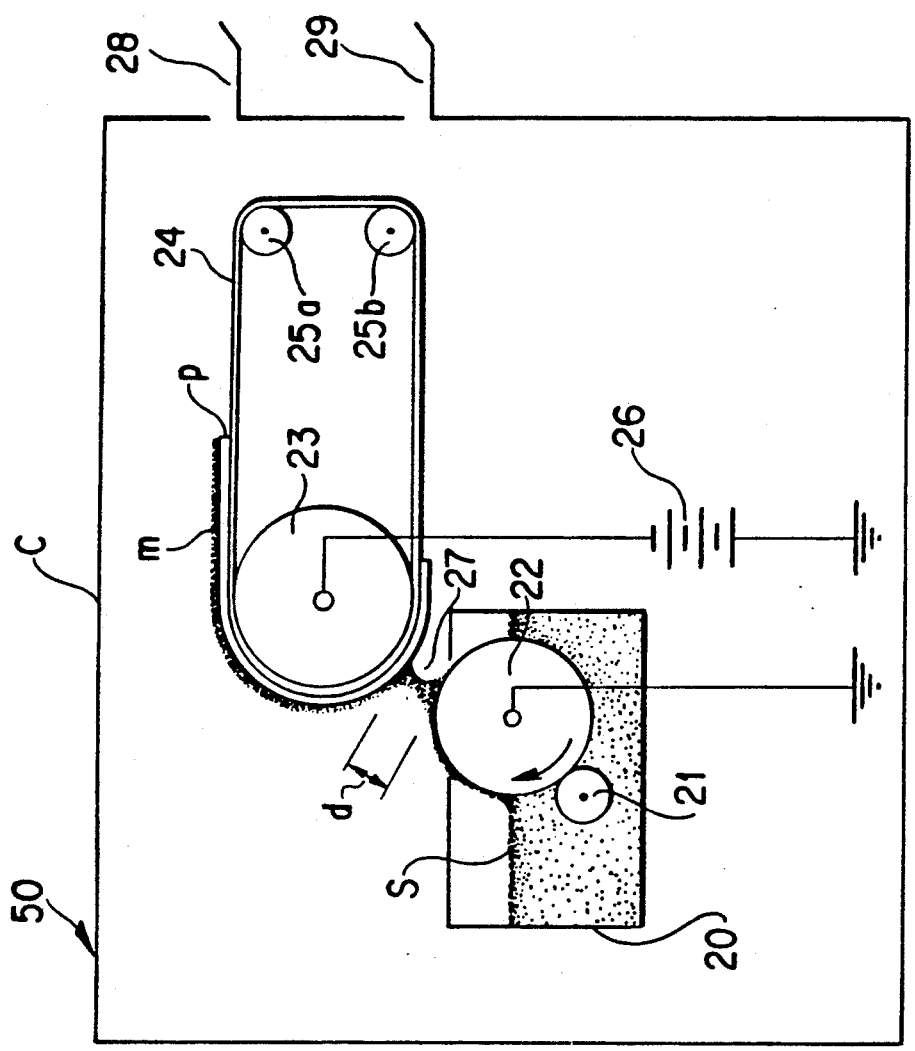
FIG. 1 shows a conventional developer material coating apparatus.
Figure 3:
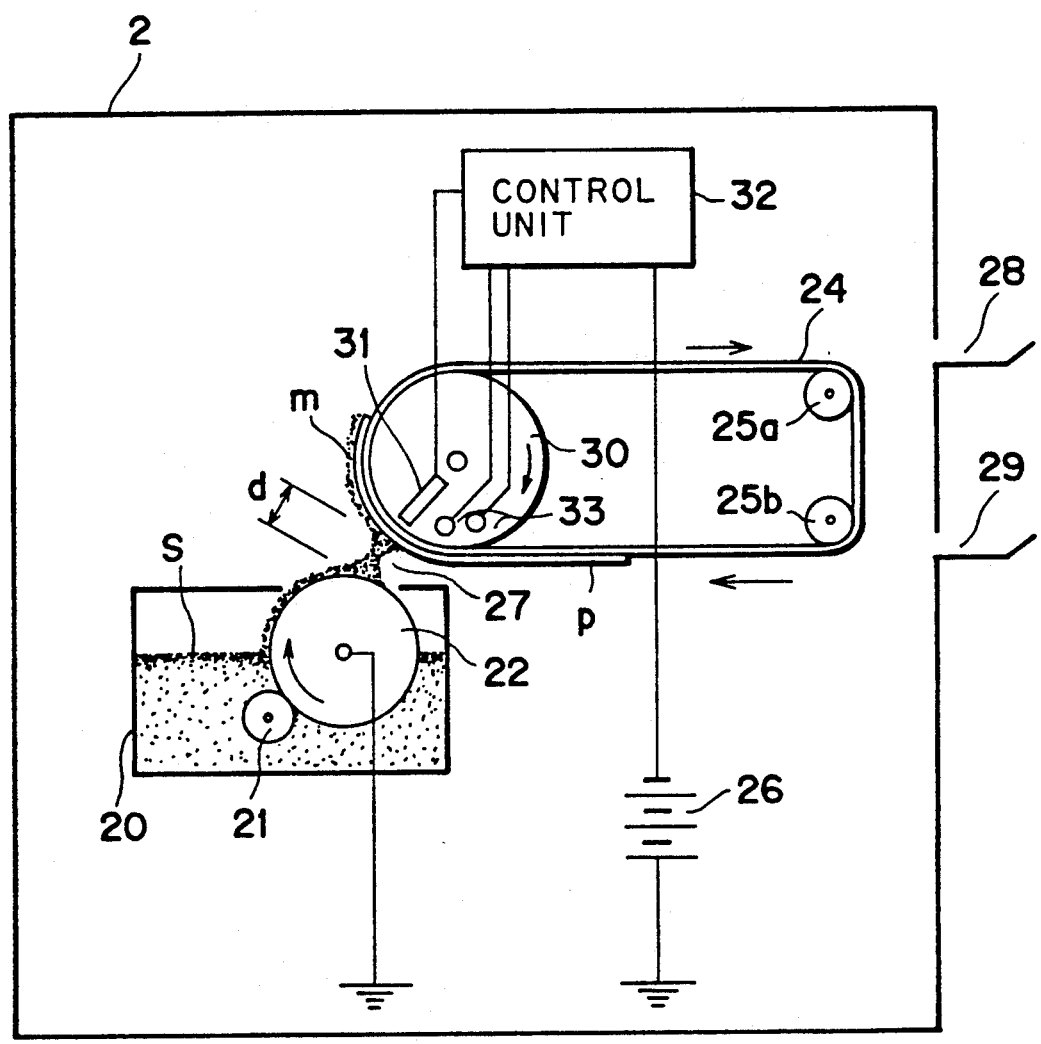
FIG. 3 shows a first embodiment of the developer material coating apparatus according to this invention.

FIG. 3 shows a first embodiment of the developer material coating apparatus of this invention. In the first embodiment, the construction thereof is substantially similar to that of the developer material coating apparatus as shown in FIG. 1, except for some elements as described below. The same elements as those of FIG. 1 are represented by the same reference numerals, and the description thereof is eliminated.

In this embodiment, the counter electrode roller 30 has a hollow structure having outer and inner surfaces, and the outer surface thereof is an insulating thin surface which faces the developer material coating region 27. Further, plural electrodes 31 for selectively coating the developer material on a desired surface portion of the support member P are juxtaposedly arranged along the inner surface thereof within the inner side of the counter electrode roller 30, a sensor for detecting a position and a sheet feeding speed of the support member P is provided, and a control unit 32, which is supplied with a voltage by the D.C. voltage source 26, is provided to selectively apply voltages to each of the electrodes 31.

Figure 4:
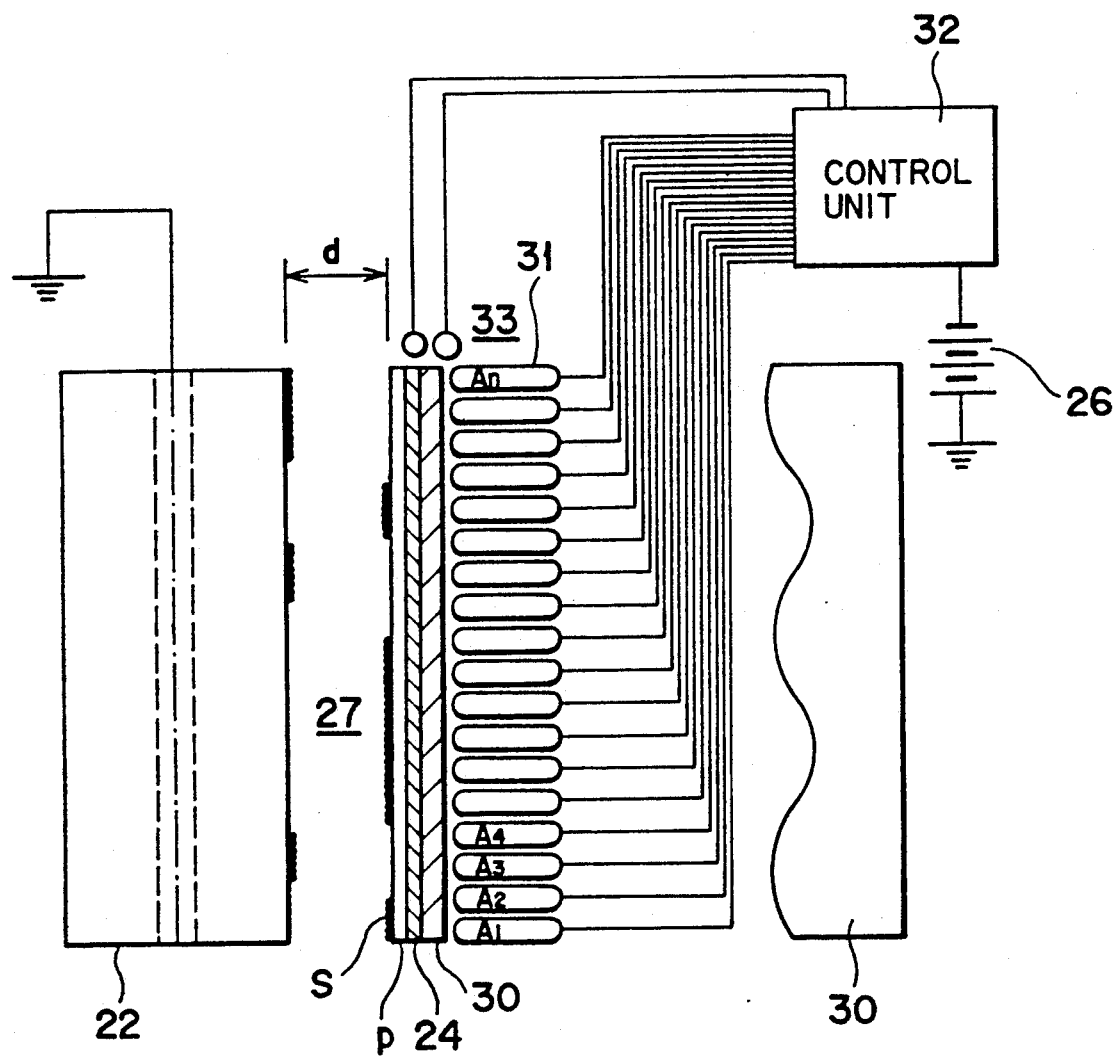
FIG. 4 shows the arrangement of electrodes for selectively coating developer material on a support member, which is used in the first embodiment as shown in FIG. 3.

FIG. 4 shows an arrangement of the electrodes for performing a selective coating operation of the developer material, which are used in the first embodiment of the developer material coating apparatus as shown in FIG. 3.

In the counter electrode roller 30, n of electrodes $A_1$, ..., $A_n$ are positionally fixedly aligned with one another along the inner surface of the counter electrode roller 30, and thus are positionally moved even when the counter electrode 30 roller is rotated.

An operation of the first embodiment of the developer material coating apparatus will be described hereunder.

Upon rotation of the carry roller 22 and the supply roller 21 by a motor (not shown), the granular developer material S accommodated in the tank 20 is supplied to the surface of the carry roller 22 by the supply roller 48. Since the carry roller 22 has a surface formed of insulating material which is negatively chargeable, the developer material S which is frictionally contacted with the surface of the carry roller 22 is positively charged. The charged developer material S is carried on the carry roller 22 and fed to the developer material coating region 27.

On the other hand, the support member P is inserted through the sheet inlet 29 to the inside of the apparatus and fed to the developer material coating region 27 by the carry belt 24 serving as a part of the feeding means, so that it is coated with the developer material S. Immediately after the support member P enters the developer material coating region 27, the sensor detects the position and the feeding speed of the support member P to output a signal representing a detection result. Upon receiving the signal, the control unit 32 selectively supplies a negative voltage of the D.C. voltage source 26 to the plural electrodes 31 arranged juxtaposedly along the inner surface of the counter electrode roller 33, so that a negative electric field locally occurs between the electrodes supplied selectively with the negative voltage and those portions on the outer surface of the counter electrode roller 33 which correspond to the electrodes.

The positively-charged particles of the developer material S travel from the carry roller 22 toward the electrodes supplied with the negative voltage through the developer material coating region 27 by the negative electric field. As a result, the developer material can be coated on desired portions on the surface of the support member P. Of course, the desired portions are beforehand selected by the control unit 32 through external input means (not shown) such as a key board or a program. For example, when the electrodes $A_1$ and $A_2$ are selectively supplied with the negative voltage, the positively-charged particles of the developer material S becomes electrically attached on those portions of the support member which positionally correspond to the electrodes supplied with the negative voltage. On the other hand, the developer material S is not attached on those portions of the support member which positionally correspond to the electrodes $A_3$ and $A_4$ that are not supplied with the negative voltage.

The support member P which has been coated with the developer material S is fed to the sheet outlet 28 while carried on the carry belt 24 and discharged therethrough to the outside of the apparatus.

Figure 5:
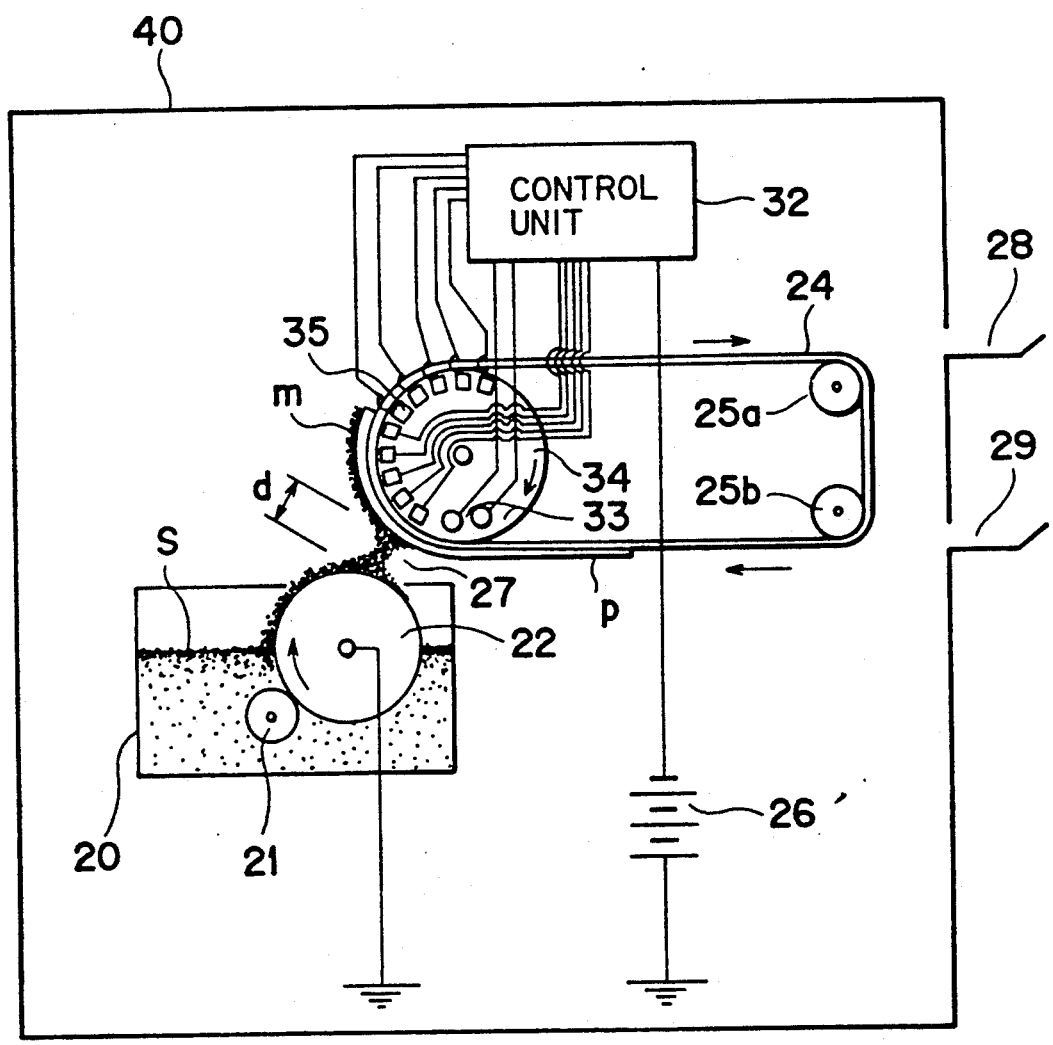
FIG. 5 shows a second embodiment of the developing material coating apparatus according to this invention.

FIG. 5 shows a second embodiment of the developer material coating apparatus according to this invention. The developer material coating apparatus of this embodiment has the substantially same construction as that of FIG. 1, except for the following points. The same elements as those of FIG. 1 are represented by the same reference numerals, and thus the description thereof is eliminated.

In the second embodiment as well as the first embodiment, the counter electrode roller 34 has a thin insulating surface thereon, plural electrodes 35 are positionally fixedly provided along the inner surface of the counter electrode roller 34 independently of the rotation of the counter electrode roller 34, a sensor 33 for detecting a position and a feeding speed of the support member P is provided, and a control unit 32, which is supplied with a voltage of the D.C. voltage source 26, is provided to selectively apply a voltage to each of the electrodes 35.

Figure 6:
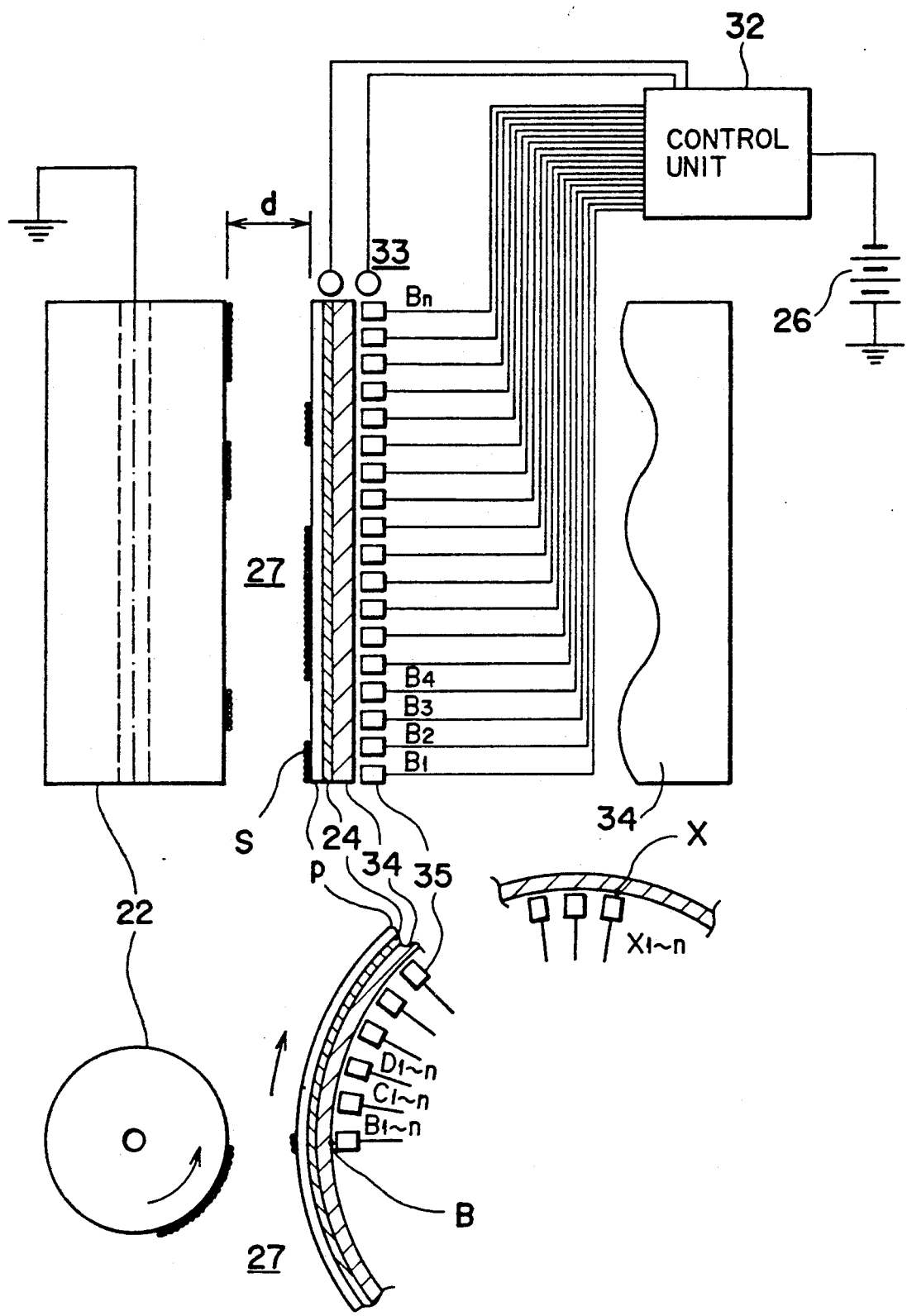
FIG. 6 shows the arrangement of electrodes for selectively coating developer material on a support member, which is used in the second embodiment as shown in FIG. 4.

FIG. 6 shows an arrangement of the electrodes 35 used in the developer material coating apparatus as shown in FIG. 5.

Unlike the first embodiment in which the electrodes for a selective coating operation of the developer material are one-dimensionally arranged along the inner surface of the counter electrode roller 30, the electrodes of the second embodiment are two-dimensionally juxtaposedly arranged along the inner surface of the counter electrode roller 34. That is, several arrays ($B_{1-n}$ to $X_{1-n}$) of the electrodes, each comprising one-line array of the electrodes which are aligned in a longitudinal direction of the counter electrode roller 30 as shown in FIG. 4, are arranged in a rotational direction of the counter electrode roller 34 along the inner surface thereof. The electrode arrays $B_{1-n}$ (a starting electrode array) to $X_{1-n}$ (an ending electrode array) are fixedly disposed between the position (B) where the electrode array $B_{1-n}$ faces the developer material coating region 27 through the outer surface of the counter electrode roller 34, and the position (X) where the support member P is detached from the counter electrode roller 34, respectively.

As described above, in this embodiment, control means for selectively coating the developer material on a desired portion of the support member P comprises plural arrays ($B_{1-n}$, $C_{1-n}$, ... $X_{1-n}$) of electrodes which are arranged in a peripheral (rotational) direction of the counter electrode roller 34, each of which comprises n of electrodes arranged in an axial (longitudinal) direction of the counter electrode roller 34. Each of all electrodes are fixedly disposed in such a manner as to face the inner surface of the counter electrode roller 34.

An operation of the developer material coating apparatus of this embodiment will be described hereunder.

Upon rotation of the carry roller 22 and the supply roller 21 by a motor (not shown), the granular developer material S accommodated in the tank 20 is supplied to the surface of the carry roller 22 by the supply roller 21. Since the carry roller 22 has a surface formed of insulating material which is negatively chargeable, the developer material S which is frictionally contacted with the surface of the carry roller 22 is positively charged. The charged developer material S is carried on the carry roller 22 and fed to the developer material coating region 27.

On the other hand, the support member P is inserted through the sheet inlet 29 to the inside of the apparatus and fed to the developer material coating region 27 by the carry belt 24 serving as a part of the feeding means, so that it is coated with the developer material S. Immediately after the support member P invades the developer material coating region 27, the sensor detects the position and the feeding speed of the support member P to output a signal representing a detection result. Upon receiving the signal, the control unit 32 selectively supplies a negative voltage from the D.C. voltage source 26 to the plural electrodes 35 arranged juxtaposedly along the inner surface of the counter electrode roller 34, so that a negative electric field locally occurs between the electrodes supplied selectively with the negative voltage and those portions on the outer surface of the counter electrode roller 34 which correspond to the electrodes.

The positively-charged particles of the developer material S travel from the carry roller 22 toward the electrodes supplied with the negative voltage through the developer material coating region 27 by the negative electric field. As a result, the developer material can be coated on desired portions of the surface of the support member P. Of course, the desired portions are beforehand selected by the control unit 32 through external input means (not shown) such as a key board, or a program similarly in the first embodiment.

For example, when the support member P invades the developer material coating region 27, of the first array $B_{1-n}$, the electrodes $B_1$ and $B_2$ are first selectively supplied with the negative voltage, the positively-charged particles of the developer material S is electrically attached on those portions of the support member which positionally correspond to the electrodes $B_1$ and $B_2$ supplied with the negative voltage. On the other hand, the developer material S is not attached on those portions of the support member which positionally correspond to the electrodes $B_3$ and $B_4$ that are not supplied with the negative voltage. Thereafter, the support member P which has been coated with the developer material at the position corresponding to the electrodes $B_1$ and $B_2$ is fed along the peripheral surface of the counter electrode roller 34 through the carry belt 24. In this case, a negative voltage of the D.C. voltage source 26 is further supplied, by the control unit 32, to each of the electrodes $C_1$, $C_2$, $D_1$, $D_2$, ..., $X_1$, $X_2$ which are disposed in the same peripheral line as the electrodes $B_1$ and $B_2$, so that the particles of the developer material S are held on the support member P without detaching therefrom.

Further to the selecting operation of the electrodes of the starting electrode array $B_{1-n}$, some electrodes of the first electrode array $B_{1-n}$ are newly selected to be supplied with the negative voltage, and the above process is repeated, so that the newly coated developer material S is fixedly attached on the support member P without detaching therefrom, like the firstly-coated developer material S.

The support member P thus selectively coated with the developer material S is fed to the sheet outlet 28 while carried on the carry belt 24 and discharged therethrough to the outside of the apparatus.

This invention is not limited to the above embodiments, and as described below, any modifications may be made thereto insofar as they do not depart from the subject matter of this invention.

The surface of the carry roller 22 may be formed of a positively-chargeable insulating material. In this case, the developer material is negatively charged, and therefore a positive voltage must be applied to the electrodes 31 and 35 provided along the inner surface of the counter electrode rollers 30 and 34.

Further, the electrodes $A_3$ and $A_4$ of the first embodiment and the electrodes $B_3$, $B_4$, $C_3$, $C_4$, $D_3$, $D_4$, ..., $X_3$ and $X_4$ of the second embodiment may be supplied with a voltage having opposite polarity to that of the voltage supplied to the electrodes $A_1$ and $A_2$ of the first embodiment, and the electrodes $B_1$ and $B_2$ of the second embodiment. In this case, the particles of the developer material S are completely prevented from attaching the surface portions of the support member P corresponding to the electrodes $A_3$ and $A_4$ of the first embodiment and the electrodes $B_3$, $B_4$, $C_3$, $C_4$, $D_3$, $D_4$, ..., $X_3$ and $X_4$.

Still further, in the above-described embodiments, the electrodes 31 and 35 are juxtaposedly arranged along the inner surface of the counter electrode rollers 30 and 34 in such a manner as to be positionally (spatially) fixed in spite of the rotation of the counter electrode rollers 30 and 34. That is, the electrodes are provided away from the inner surface of the counter electrode rollers 30 and 34. However, the electrodes may be provided on the outer or inner surface of the counter electrode roller. In this case, an insulator is provided between the neighboring electrodes to prevent short-circuit therebetween. Further, since the electrodes are fixed to the outer or inner surface of the counter electrode roller and thus are rotated in accordance with the rotation of the counter electrode roller, a switching unit such as a commutator used in a motor or a rotary switch is provided to switch the electrodes to be supplied with the voltage in accordance with the feeding of the support member P.

As described above, according to this invention, by operating the control unit or utilizing a program, the developer material can be coated on a desired portion of the support member. In other words, no developer material can be coated on a desired portion of the support member. Further, by beforehand detecting non image portion on the support member P in an exposure process for an original and inputting an information on non image portion to the control unit, no developer material can be coated on the non image portion.

Accordingly, the developer material coating apparatus of this invention can overcome the disadvantage of the conventional developer material coating apparatus in which the developer material is coated on the whole surface of the support member. That is, in the developer material coating apparatus of this invention, printed letters and characters formed by a laser printer or typewriter can be completely and clearly formed on the support member without blurring.

What is claimed is:

1. A developer material coating apparatus for electrostatically coating developer material on a support member in a developer material coating region to a developer sheet, comprising:
   support member feeding means for feeding the support member through the developer material coating region while carrying the support member thereof, said support member feeding means having a first surface for mounting the support member thereon and a second surface located at an opposite side to said first surface;
   developer material coating means for triboelectrically charging the developer material and electrostatically supplying the charged developer material to the support member disposed in the developer material coating region; and
   control means for selectively coating the charged developer material on a desired portion of the support member, wherein said control means comprises at least one array of electrodes fixedly disposed so as to contact said second surface of said support member feeding means, and a control unit for selectively supplying at least one of said electrodes with a voltage having an opposite polarity to that of the charged developer material while the charged developer material is coated on the support member.

2. A developer material coating apparatus as claimed in claim 1, wherein said control means further comprises a sensor for detecting a position and a feeding speed of the support member in the developer material coating region to output a signal representing a detection result to said control unit.

3. A developer material coating apparatus as claimed in claim 1, wherein said support member feeding means comprises a carry belt for carrying the support member, and a roller having outer and inner surfaces for supporting said carry belt on the outer surface thereof.

4. A developer material coating apparatus as claimed in claim 3, wherein the electrodes are juxtaposedly arranged along the inner surface in such a manner as to face the inner surface.

5. A developer material coating apparatus as claimed in claim 3, wherein the outer surface of said roller has an insulating surface.

6. A developer material coating apparatus as claimed in claim 3, wherein said control means comprises plural arrays of electrodes juxtaposedly arranged along the inner surface of said roller in a peripheral direction thereof, electrodes of each array being aligned along the inner surface in an axial direction of said roller.

7. A developer material coating apparatus as claimed in claim 1, wherein said developer material coating means comprises a carry roller for frictionally contacting with the developer material to triboelectrically charge the developer material.

8. A developer material coating apparatus as claimed in claim 7, wherein said carry roller comprises a positively or negatively chargeable insulating surface.

9. A developer material coating apparatus for electrostatically coating developer material on a support member in a developer material coating region to a developer sheet, comprising:
   support member feeding means for feeding the support member in a feeding direction through the developer material coating region while carrying the support member thereof, said support member feeding means having a rotation member rotatable about a predetermined axis traversing the feeding direction;
   developer material coating means for triboelectrically charging the developer material and electrostatically supplying the charged developer material to the support member disposed in the developer material coating region; and
   control means for selectively coating the charged developer material on a desired portion of the support member, wherein said control means comprises at least one array of plural electrodes arranged in a direction of said predetermined axis and disposed adjacently to the surface of said support member feeding means and a control unit for selectively supplying said electrodes with a voltage having an opposite polarity to that of the charged developer material.

10. A developer material coating apparatus as claimed in claim 9, wherein said control means further comprises a sensor for detecting a position and a feeding speed of the support member in the developer material coating region to output a signal representing a detection result to said control unit.

11. A developer material coating apparatus as claimed in claim 9, wherein said support member feeding means comprises a carry belt for carrying the support member, and a roller having outer and inner surfaces for supporting said carry belt on the outer surface thereof.

12. A developer material coating apparatus as claimed in claim 11, wherein the electrodes are juxtaposedly arranged along the inner surface in such a manner as to face the inner surface.

13. A developer material coating apparatus as claimed in claim 11, wherein the outer surface of said roller has an insulating surface.

14. A developer material coating apparatus as claimed in claim 11, wherein said control means comprises plural arrays of electrodes juxtaposedly arranged along the inner surface of said roller in a peripheral direction thereof, electrodes of each array being aligned along the inner surface in an axial direction of said roller.

15. A developer material coating apparatus as claimed in claim 11, wherein said developer material coating means comprises a carry roller for frictionally contacting with the developer material to triboelectrically charge the developer material.

16. A developer material coating apparatus as claimed in claim 11, wherein said carry roller comprises a positively or negatively chargeable insulating surface.

* * * * *